United States Patent
Xu et al.

(10) Patent No.: US 10,171,205 B2
(45) Date of Patent: Jan. 1, 2019

(54) SPACE TIME LABELLING TECHNIQUE FOR WIRELESS COMMUNICATION SYSTEMS

(71) Applicant: UNIVERSITY OF KWAZULU-NATAL, Westville (ZA)

(72) Inventors: Hongjun Xu, Durban (ZA); Kyle Govindasamy, Durban (ZA)

(73) Assignee: University of Kwazulu-Natal, Westville (ZA)

( * ) Notice: Subject to any disclaimer, the term of this patent is extended or adjusted under 35 U.S.C. 154(b) by 0 days.

(21) Appl. No.: 15/740,364

(22) PCT Filed: Jun. 28, 2016

(86) PCT No.: PCT/IB2016/053849
§ 371 (c)(1),
(2) Date: Dec. 28, 2017

(87) PCT Pub. No.: WO2017/002010
PCT Pub. Date: Jan. 5, 2017

(65) Prior Publication Data
US 2018/0198563 A1    Jul. 12, 2018

(30) Foreign Application Priority Data
Jun. 29, 2015 (GB) .................................. 1511353.3

(51) Int. Cl.
*H04L 1/06* (2006.01)
*H04L 27/34* (2006.01)
(Continued)

(52) U.S. Cl.
CPC .......... *H04L 1/0625* (2013.01); *H04L 1/0643* (2013.01); *H04L 1/1614* (2013.01);
(Continued)

(58) Field of Classification Search
CPC ... H03G 3/3042; H04W 52/26; H04L 5/0023; H04L 1/06; H04L 25/0204;
(Continued)

(56) References Cited

U.S. PATENT DOCUMENTS

| 6,115,427 A | * | 9/2000 | Calderbank | ............ | C07K 14/78 375/240 |
| 8,503,562 B2 | * | 8/2013 | Levy | ................... | H04L 27/2602 370/208 |

(Continued)

OTHER PUBLICATIONS

International Search Report for PCT/IB2016/053849 dated Sep. 27, 2016.
(Continued)

*Primary Examiner* — Khanh C Tran
(74) *Attorney, Agent, or Firm* — Thomas | Horstemeyer, LLP

(57) ABSTRACT

A space time labelling technique for wireless communication systems is provided. A transmitter for implementing the technique includes a first bit mapper and a second bit mapper which is different to the first bit mapper and first and second transmitters. A processor is connected to the first and second mappers and the first and second transmitters and controls these to receive two bit streams and simultaneously feed these into the first mapper and the second mapper. The first mapper maps these into first and second mapped bit streams and the second mapper maps these into third and fourth mapped bit streams which are different from the first and second mapper bit streams. The first mapped bit stream is transmitted in a first time slot via the first transmitter and the second mapped bit stream is transmitted in the first time slot via the second transmitter. The third mapped bit stream is transmitted in a second time slot via the second transmitter and finally the fourth mapped bit stream is transmitted in a second time slot via the first transmitter.

3 Claims, 10 Drawing Sheets

(51) Int. Cl.
*H04L 1/16* (2006.01)
*H04L 1/00* (2006.01)

(52) U.S. Cl.
CPC .......... *H04L 27/34* (2013.01); *H04L 27/3477* (2013.01); *H04L 1/0057* (2013.01)

(58) Field of Classification Search
CPC .............. H04L 27/2634; H04L 1/0057; H04L 1/0625; H04L 1/1614; H04L 27/3477; H04L 1/0643; H04N 21/2383; H04N 21/4382
See application file for complete search history.

(56) References Cited

U.S. PATENT DOCUMENTS

| | | | |
|---|---|---|---|
| 2008/0123618 A1* | 5/2008 | Papadopoulos ....... | H04L 1/0625 370/345 |
| 2010/0067460 A1 | 3/2010 | Hu et al. | |
| 2017/0288926 A1* | 10/2017 | Zhao ..................... | H04L 1/0625 |

OTHER PUBLICATIONS

Moon, et al., "Bit Rearrangement for MIMO Retransmissions", Global Telecommunications Conference, 2007, pp. 3509-3513.
Gidlund, "Performance of Combined Constellation Rearrangement and Space-Time Block Coding Scheme for Multi-Level Modulation", IEEE International Symposium on Personal, Indoor and Mobile Radio Communications, Sep. 1, 2007, pp. 1-5.

\* cited by examiner

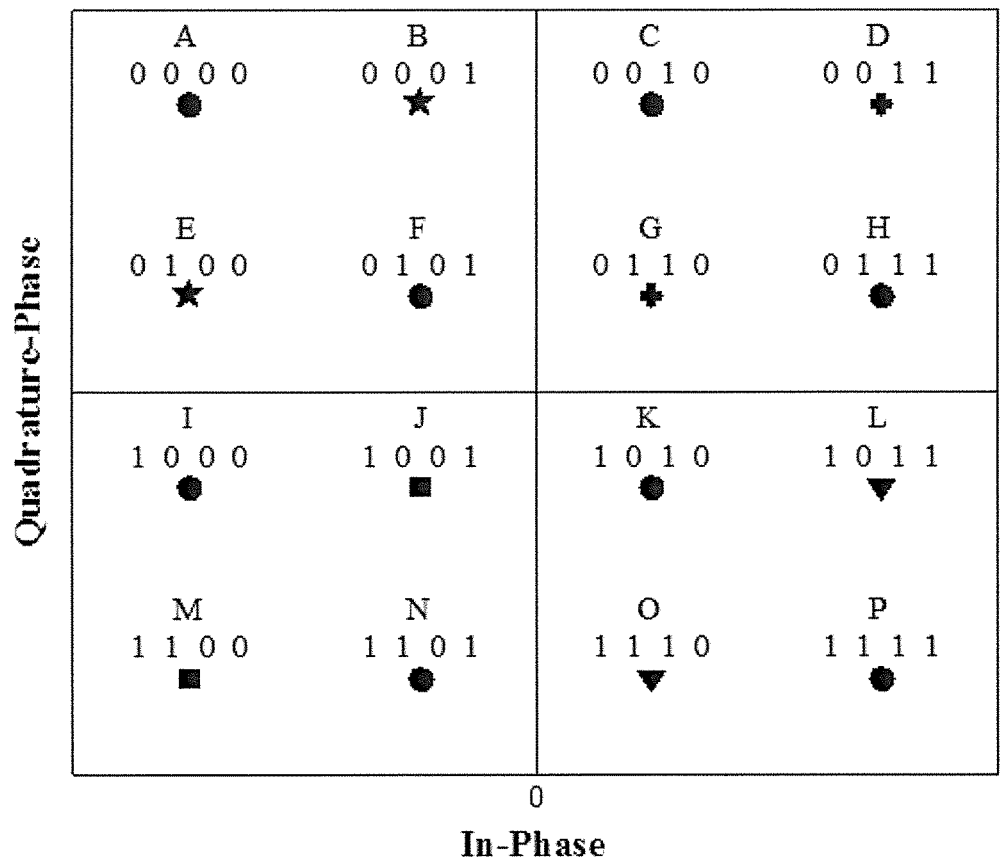
16-QAM Gray-coded labeling map
Figure 3.1

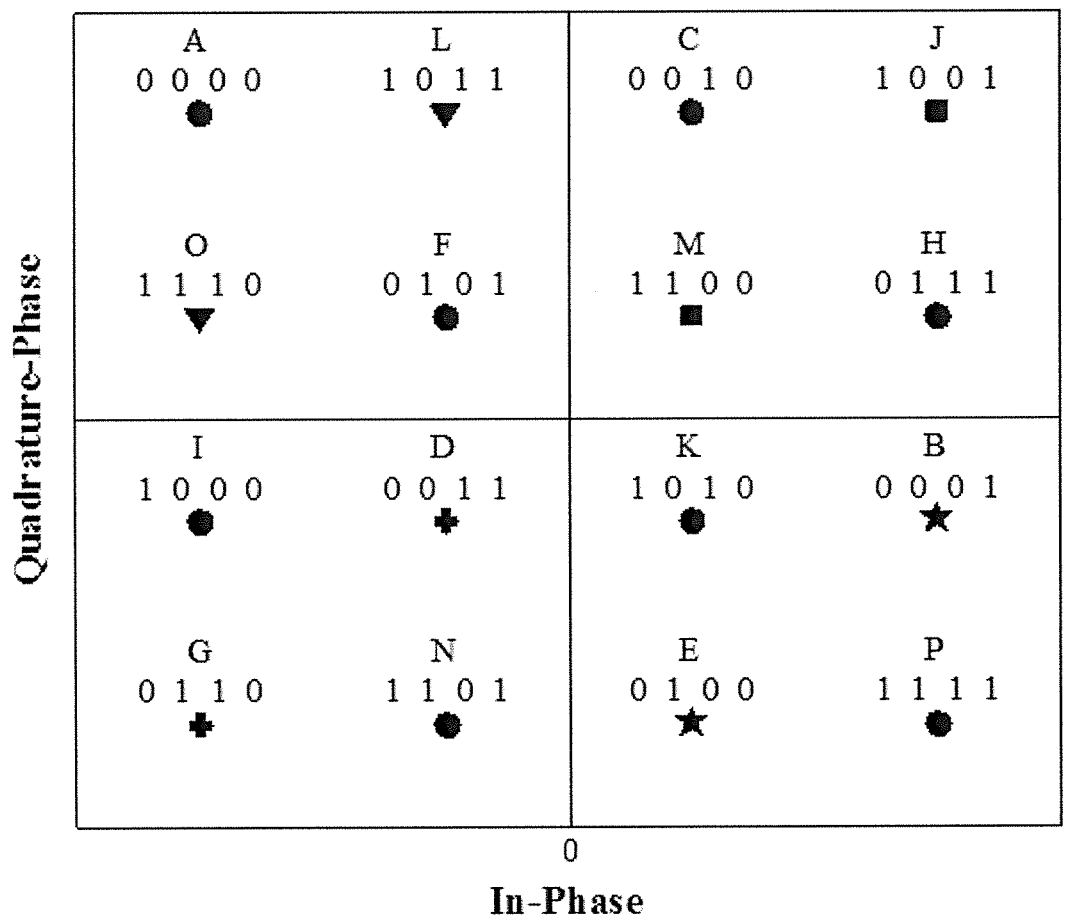
16-QAM alternate grouping and swapping
Figure 3.2

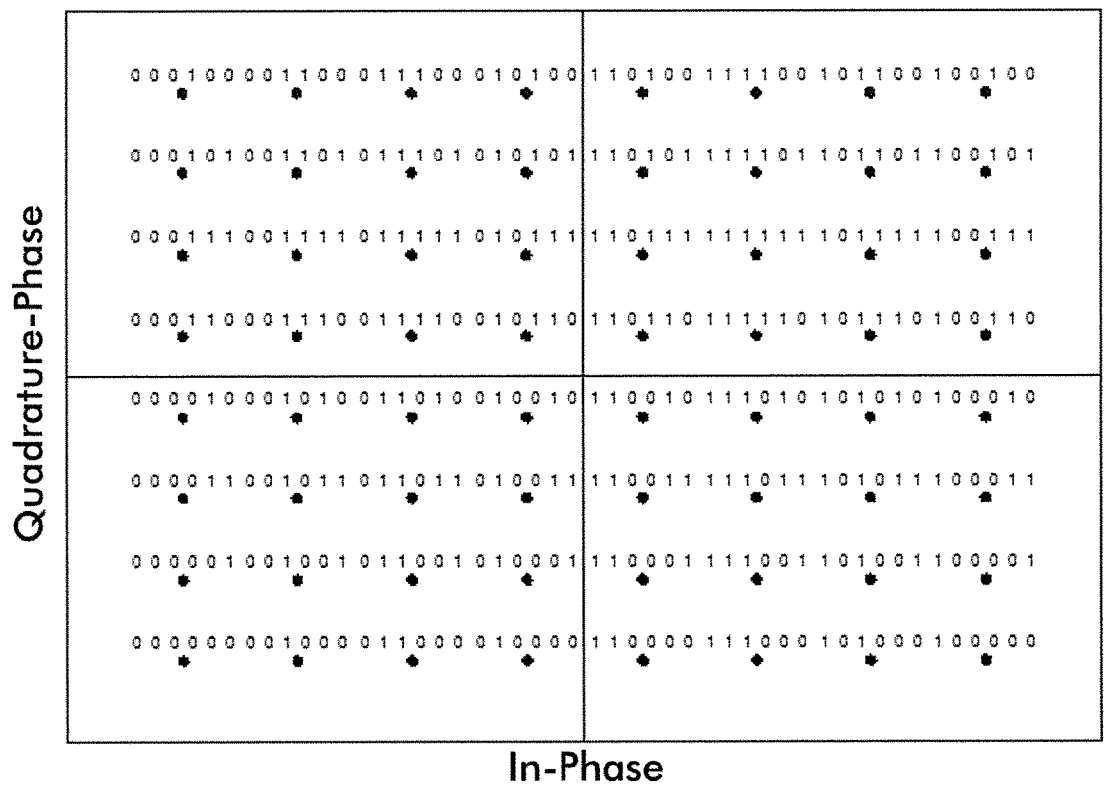
64-QAM Gray-coded labeling map *W1*
Figure 3.3

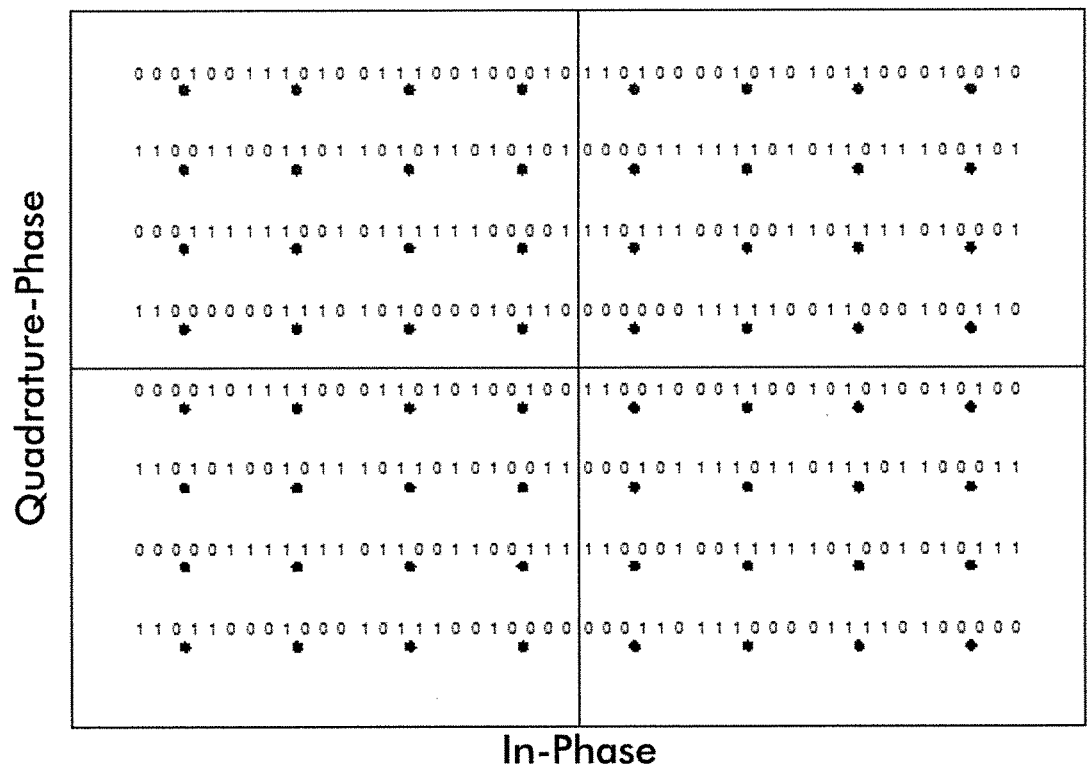
64-QAM Gray-coded labeling map W2
Figure 3.4

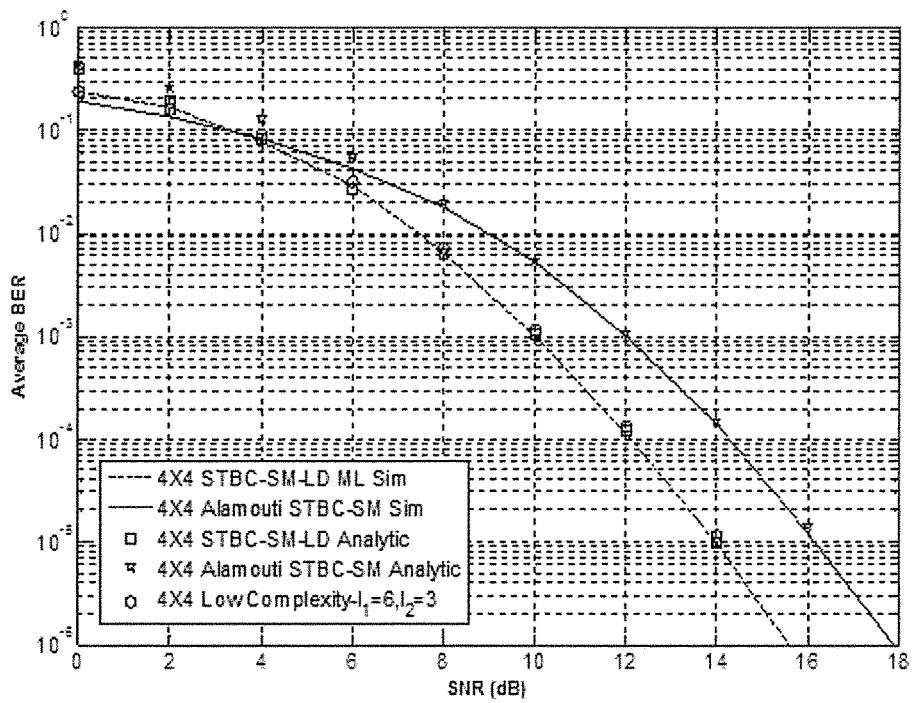
BER performance of STBC-SM-LD and Alamouti STBC-SM schemes for 16-QAM,, using the ML and proposed LC detectors with analytic bounds.
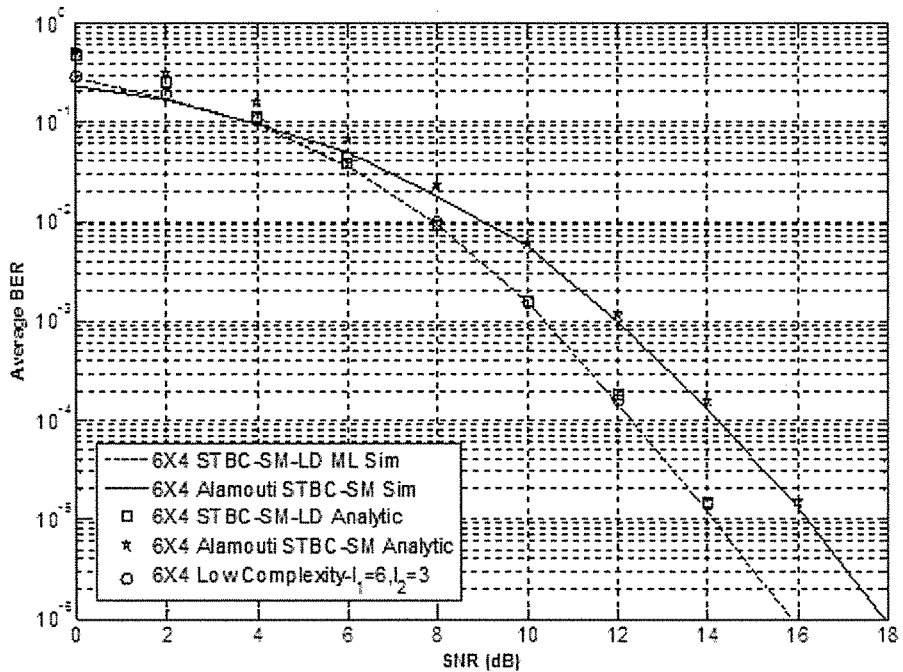
BER performance of STBC-SM-LD and Alamouti STBC-SM schemes for 16-QAM,, using the ML and proposed LC detectors with analytical bounds.

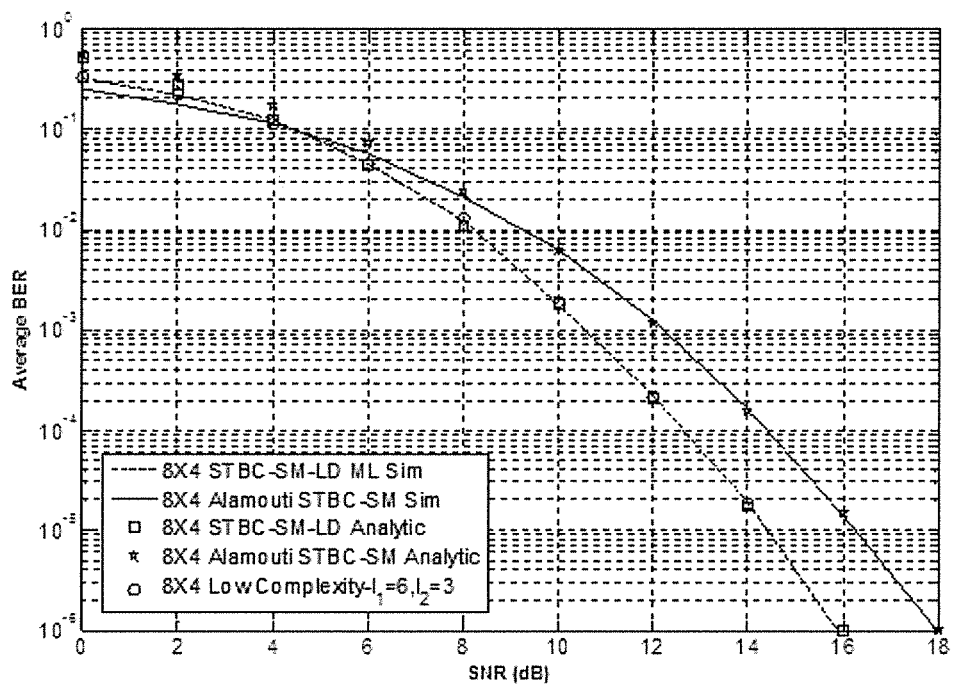
BER performance of STBC-SM-LD and Alamouti STBC-SM schemes for 16-QAM,, using the ML and proposed LC detectors with analytical bounds.
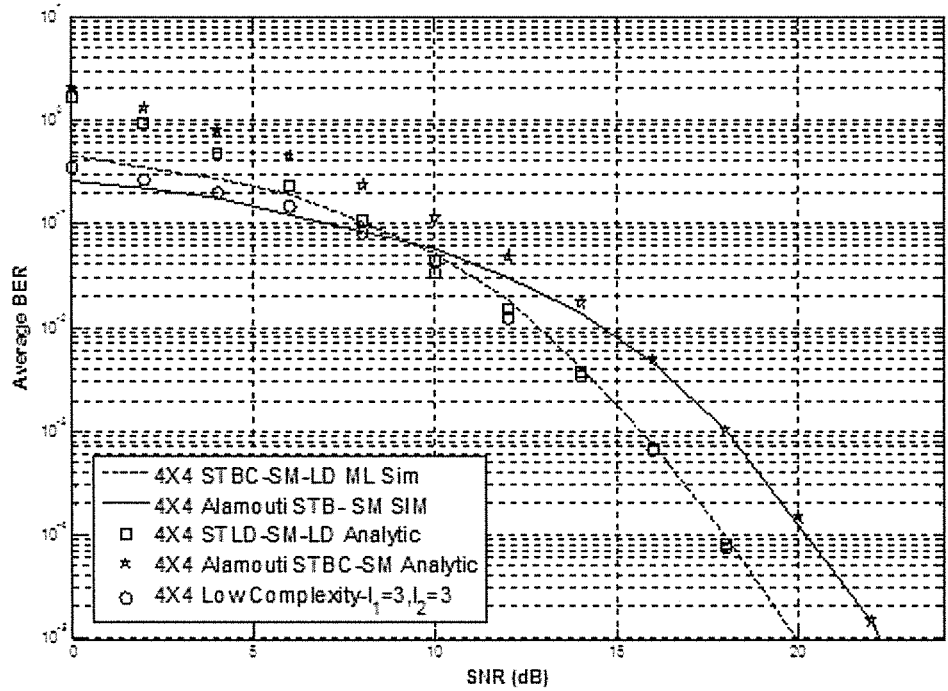
BER performance of STBC-SM-LD and Alamouti STBC-SM schemes for 64-QAM,, using the ML and proposed LC detectors with analytical bounds.

Comparison of error performance for STLD, optimal ML and LC detectors including theoretical upper bounds for 16-QAM and 64-QAM.

SPACE TIME LABELLING TECHNIQUE FOR WIRELESS COMMUNICATION SYSTEMS

CROSS-REFERENCE TO RELATED APPLICATION

This application is the 35 U.S.C. § 371 national stage application of PCT Application No. PCT/IB2016/053849, filed Jun. 28, 2016, where the PCT claims priority to and the benefit of, GB Patent Application No. 1511353.3, filed Jun. 29, 2015, both of which are herein incorporated by reference in their entireties.

BACKGROUND OF THE INVENTION

This patent application relates to a wireless communication system and particularly to a space time labelling technique for wireless communication systems.

Next generation wireless communication systems demand higher data rates, spectral efficiency and link reliability. Hence, in recent years, there has been an upsurge in research regarding multiple-input multiple-output (MIMO) antenna systems to meet next generation wireless communication systems criteria. Several transmission schemes have been proposed to meet the above criteria.

However, these systems suffer high inter-channel interference (ICI) and require inter-antenna synchronisation (IAS). Furthermore, in order to achieve optimal bit error rate (BER) performance, these systems require detection schemes with high computational complexity, e.g. maximum-likelihood (ML) detection.

The present invention provides an improved wireless communication.

SUMMARY OF THE INVENTION

According to a first aspect of the invention there is provided a transmitter for a wireless communications system for implementing space-time labelling diversity for uncoded conventional modulation, the transmitter including:
  a first bit mapper;
  a second bit mapper which is different to the first bit mapper;
  a first transmitter;
  a second transmitter; and
  a processor connected to the first and second mappers and the first and second transmitters, the processor controlling these to:
    receive two bit streams and simultaneously feed these into the first mapper and the second mapper, wherein the first mapper maps these into first and second mapped bit streams and the second mapper maps these into third and fourth mapped bit streams which are different from the first and second mapper bit streams;
    transmit the first mapped bit stream in a first time slot via the first transmitter;
    transmit the second mapped bit stream in the first time slot via the second transmitter;
    transmit the third mapped bit stream in a second time slot via the second transmitter; and
    transmit the fourth mapped bit stream in a second time slot via the first transmitter.

Preferably the first mapper maps the bit streams based on a conventional mapping constellation and the second mapper maps the bit streams based on placing adjacent neighbor symbols as far as possible within the constellation.

BRIEF DESCRIPTION OF THE DRAWINGS

FIG. 3 shows code labelling maps;
FIGS. 4 to 8 show BER performance of the present invention compared to standard Alamouti schemes.

DESCRIPTION OF PREFERRED EMBODIMENTS

Figure 1:
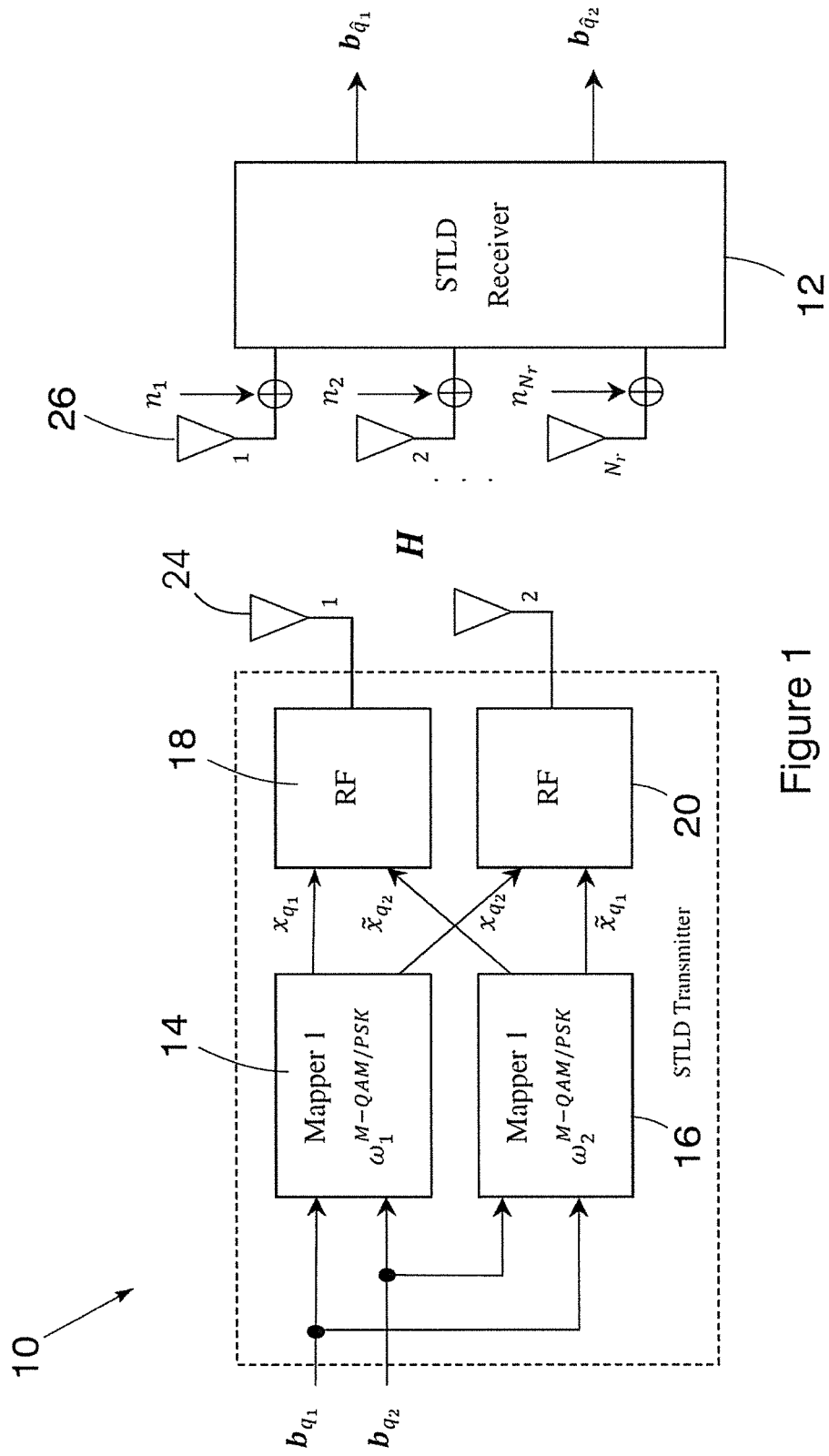
FIG. 1 shows a schematic drawing of a wireless communication system in accordance with an example embodiment.

The following explanation is for background purposes. Space-time block coding is a technique used in wireless communications to transmit multiple redundant copies of a data stream across a number of antennas and to exploit the various received versions of the data to improve the reliability of data-transfer.

The fact that the transmitted signal must traverse a potentially difficult environment with scattering, reflection, refraction and so on and may then be further corrupted by thermal noise in the receiver means that some of the received copies of the data will be 'better' than others. This redundancy results in a higher chance of being able to use one or more of the received copies to correctly decode the received signal. In fact, space-time coding combines all the copies of the received signal in an optimal way to extract as much information from each of them as possible.

For space-time block coding in particular, the data stream to be transmitted is encoded in blocks, which are distributed among spaced antennas and across time. While it is necessary to have multiple transmit antennas, it is not necessary to have multiple receive antennas, although to do so improves performance.

A space-time block code is usually represented by a matrix. Each row represents a time slot and each column represents one antenna's transmissions over time.

In this invention space-time block coding uses two transmitters to transmit two symbols over two consecutive time slots known as signaling intervals. In the first time slot symbol one and symbol two are simultaneously transmitted via transmit antenna one and two respectively, in the second time slot symbol two and symbol one are simultaneously transmitted via transmit antenna one and two respectively.

The idea is to minimise the probability of erroneously detecting transmitted symbols. This is achieved based on the fact that the probability that all the channels i.e. transmit antenna one and two and time slot one and two will be in deep fade is very low and hence the receiver will be able to detect the transmitted signal with fewer or no errors.

The detector on the receiver compares the received symbols to all possible transmitted pairs of symbols from the symbol set and chooses the closest pair. It is probable that the receiver might choose the wrong symbols, hence the message is erroneously detected.

The objective of space-time block coding is to minimise the probability of this error event occurring.

The present invention seeks to apply labelling diversity in addition to space-time block coding in an uncoded communications system. This is achieved via transmitting mapped symbol pairs in the second time slot. The mapped symbols contain the exact same set of symbols as in the first time slot except the positions of the symbols are modified. The criterion for arranging the set of symbols is to place adjacent neighbor symbols as far as possible, hence the probability of selecting the transmitted symbols' neighbor instead of the transmitted symbol is significantly minimised.

This overall error reduction significantly improves the reliability of the wireless communication system.

In the following description, for purposes of explanation, numerous specific details are set forth in order to provide a thorough understanding of an embodiment of the present disclosure. It will be evident, however, to one skilled in the art that the present disclosure may be practiced without these specific details.

Referring to the accompanying Figures, an example electronic communications system is implemented as shown in FIG. 1.

The system includes a transmitter 10 and a receiver 12.

The transmitter 10 includes a first bit mapper 14 and a second bit mapper 16 which is different to the first bit mapper.

In a preferred embodiment these two bit mappers 14 and 16 use different mapping systems. For example, the first mapper maps the bit streams based on a conventional mapping constellation and the second mapper maps the bit streams based on placing adjacent neighbor symbols as far as possible within the constellation.

The transmitter 10 also includes a first transmitter 18 and a second transmitter 20. The transmitters receive baseband signals and these signals are converted up to passband signals for transmission.

Figure 2:
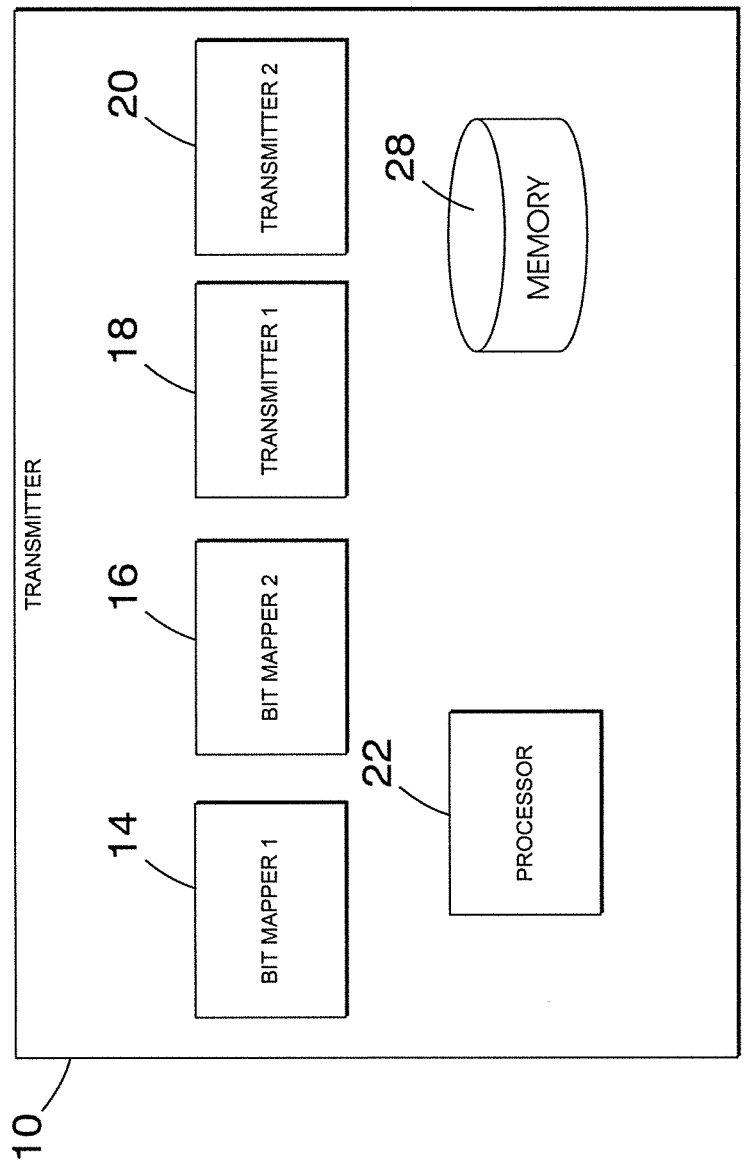
FIG. 2 shows a schematic drawing of the transmitter side from FIG. 1.
Figure 8:
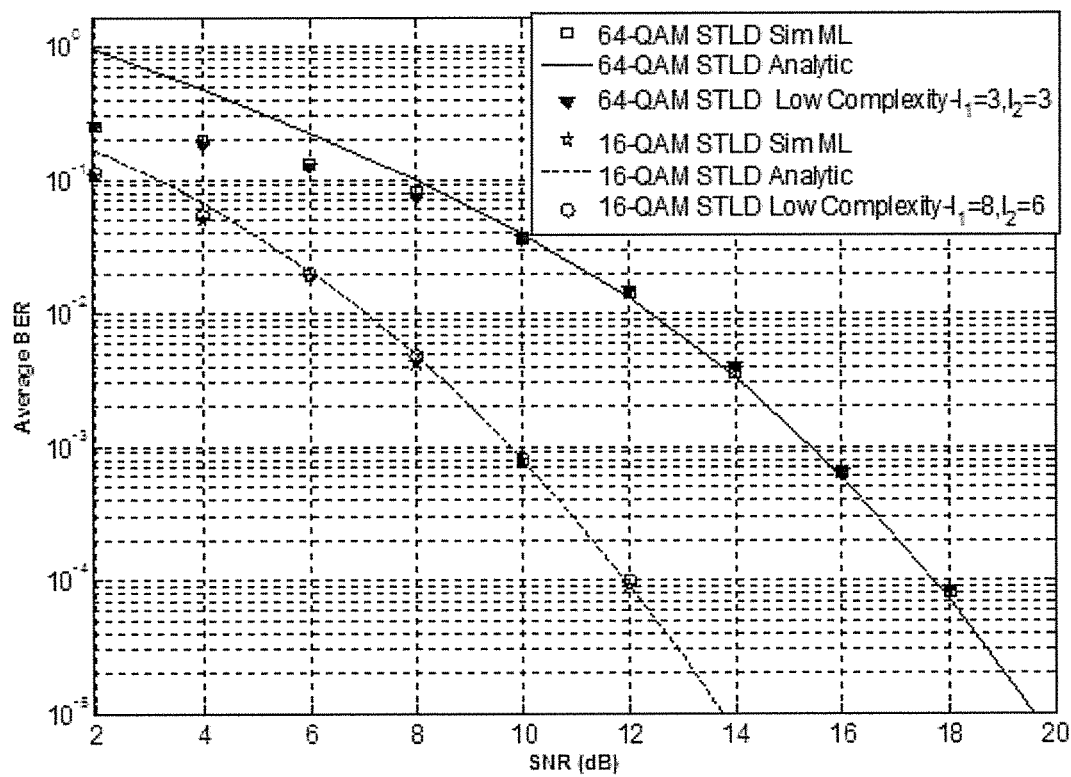
Figure 9:
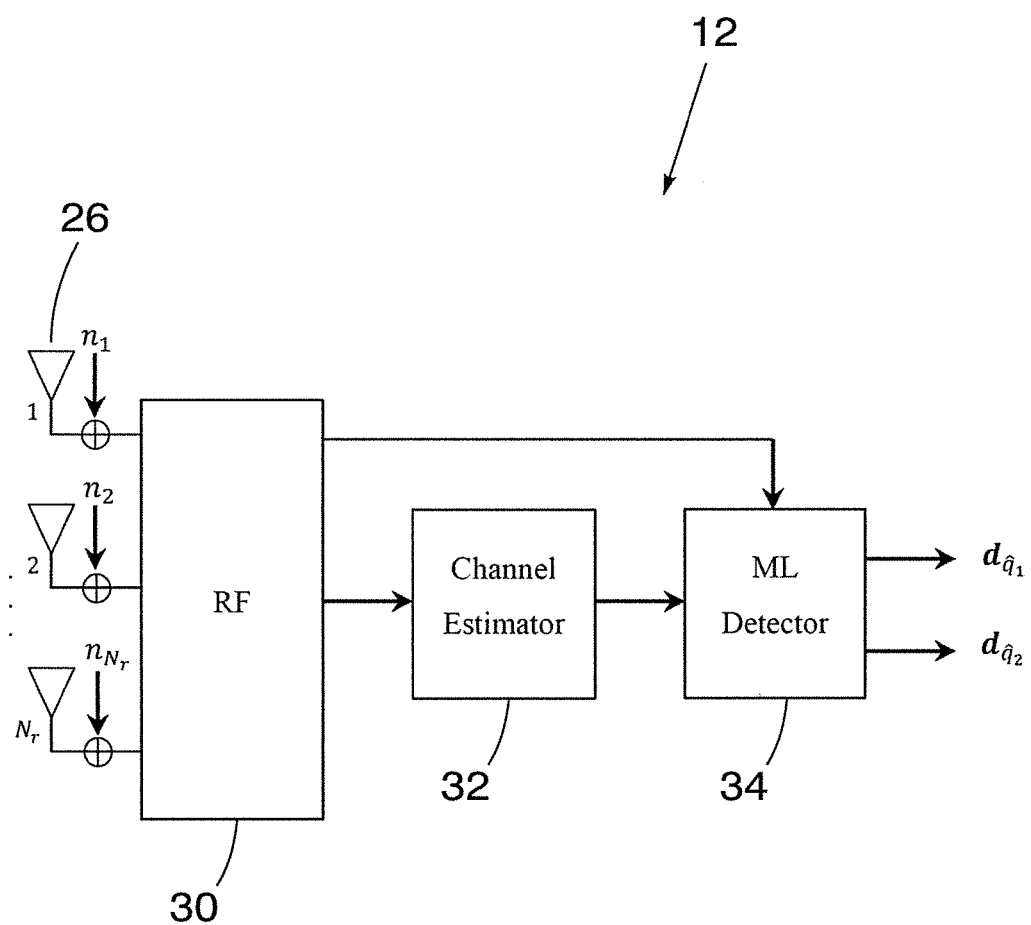
FIG. 9 shows a schematic drawing of a receiver for use with the present invention.

Referring to FIG. 2, a processor 22 is connected to the first and second mappers 14 and 16, and the first and second transmitters 18 and 20.

The processor 22 controls the operation of the transmitter 10 as follows.

In the illustrated example, two bit streams $c_1$ and $c_2$ are received at the transmitter 10 and simultaneously fed into the first mapper 14 and the second mapper 16.

The first mapper 14 maps these input bit streams $c_1$ and $c_2$ into a first symbol $x_1$ and a second symbol $x_2$ whilst the second mapper 16 maps these two bit streams $c_1$ and $c_2$ into a third symbol $\tilde{x}_1$ and a fourth symbol $\tilde{x}_2$ which are different from the first and second symbols $x_1$ and $x_2$.

Next the processor 22 controls the transmitter 10 to transmit the first mapped bit stream $x_1$ in a first time slot via the first transmitter 18 and to transmit the second mapped bit stream $x_2$ in a second time slot via the second transmitter.

In addition, the processor 22 controls the transmitter 10 to transmit the third mapped bit stream $\tilde{x}_1$ in the first time slot via the second transmitter 20 and transmit the fourth mapped bit stream $\tilde{x}_2$ in the first time slot via the first transmitter 18.

All the mapped bit streams are transmitted out from the transmitter via antennas 24.

It will be appreciated that in this scenario the bit streams are transmitted twice wherein each transmission is effectively mapped differently and transmitted via a different transmitter in a different time slot.

These are then received at the receiver 12 via antennas 26 and unmapped.

Referring to FIG. 6, The receiver 12 is comprised of; $N_r$ receive antennas 26, RF demodulator 30, channel estimator 32 and ML detector 34.

Upon reception of all the RF signals over the two consecutive time slots, the RF module 30 converts the passband signals to baseband signals which are forwarded to the ML detector 34 and the channel estimator 32. The channel estimator 32 provides the channel impulse responses which are also forwarded to the ML detector 34.

The ML detector 34 uses the channel impulse responses and the baseband signals to estimate the binary data $d_{q_1}$ and $d_{q_2}$.

The wireless communication system described above thus effectively implements a Space-Time Labelling Diversity (STLD) system. The theory underpinning the described system and illustrating the advantages of this system will now be described.

The illustrated wireless communication system is a $2 \times N_r$ system as illustrated in FIG. 1 where $N_r$ is the number of receive antennas. The fundamental idea is to transmit a mapped symbol pair in the second time slot instead of the complex conjugates transmitted in the first time slot.

The STLD system generates the 2×2 STBC based on the two mappers 14 and 16 (also $\omega_1^M$ and $\omega_2^M$ as in FIG. 1.

FIG. 3 illustrates the Gray coded labelling map $\omega_1^{16}$ and the optimised labelling map $\omega_2^{16}$ for 16-QAM, as well as the Gray coded labelling map $\omega_1^{64}$ and the optimised labelling map $\omega_2^{64}$ for 64-QAM.

A bit stream consisting of $2 \log_2 M$ random bits $d=[b_{q_1}, b_{q_2}]$ is fed into the STLD modulator to produce the modulated symbol pairs $x_1=[x_{q_1} \, x_{q_2}]^T$ and $x_2=[\tilde{x}_{q_2} \, \tilde{x}_{q_1}]^T$ for the first and second time slot respectively. Let $(x_1, x_2)$ be an ordered pair and let $\chi_{LD}$ be the set that contains all the possible modulated symbols pairs $(x_1, x_2)$, such that $(x_1, x_2) \in \chi_{LD}$.

Based on $b_{q_1}$ and $b_{q_2}$, where $b_{q_1}=[b_1^1 b_2^1 \ldots b_m^1]$, $b_{q_2}=[b_1^2 b_2^2 \ldots b_m^2]$ with $m=\log_2 M$, the labelling map $\omega_1^M$ produces $x_{q_1}$ and $x_{q_2}$, while $\omega_2^M$ produces $\tilde{x}_{q_1}$ and $\tilde{x}_{q_2}$, respectively, where $x_{q_1}$, $x_{q_2}$, $\tilde{x}_{q_1}$, and $\tilde{x}_{q_2}$ belong to the an M-QAM constellation set X, with $q_1$, $q_2 \in [1:M^2]$, $E\{|x_{q_i}|^2\}=E\{|\tilde{x}_{q_i}|^2\}=1$ and $i \in [1:2]$. As an example of the mapping, modulated symbol pairs for 16-QAM are tabulated in the following table.

| | Modulated Symbol Pairs | |
|---|---|---|
| Input Bits | $x_1$ | $x_2$ |
| 00000000 | $[-3 - 3j \; -3 - 3j]^T$ | $[1 + 1j \; 1 + 1j]^T$ |
| 00000001 | $[-3 - 3j \; -3 - 1j]^T$ | $[1 + 1j \; -3 - 1j]^T$ |
| 10100010 | $[3 + 3j \; -3 + 3J]^T$ | $[-1 - 1j \; -3 + 3j]^T$ |
| 11000011 | $[1 - 3j \; -3 + j]^T$ | $[-3 + j \; 1 - 3j]^T$ |

The received signal for the $l^{th}$ time slot is expressed as:

$$y_l = \sqrt{\rho/2} H_l x_l + n_l, l \in 1,2 \quad (1)$$

where $y_l=[y_{1,l} \, y_{2,l} \ldots y_{N_r,l}]^T$ is the $N_r \times 1$ dimensional received signal vector, $n_l=[n_{1,l} \, n_{2,l} \ldots n_{N_r,l}]^T$ is the $N_r \times 1$ dimensional additive white Gaussian noise (AWGN) vector.

The channel $H_l$ is an $N_r \times 2$ channel matrix modeled as a frequency-flat fading Rayleigh channel, where the channel gains remain constant during a time slot, but assume independent values from one time slot to another with $H_l=[h_1^l h_2^l]$ and $h_i^l=h_l=[h_{1,l} \, h_{2,l} \ldots h_{N_r,l}]^T$, $i \in [1:2]$, i.e. $E\{H_1 H_2\}=0$ and $E\{h_1^l(h_2^l)^H\}=0$. The entries of $H_l$ and $n_l$ are i.i.d according to the complex Gaussian distribution $\mathcal{CN}(0,1)$. The factor 2 in $\sqrt{\rho/2}$ is to ensure normalisation such that the average signal to noise ratio (SNR) is equally divided amongst the active transmit antennas and hence $\sqrt{\rho/2}$ is the average SNR at each receiver antenna.

At the receiver 12, an ML detector performs an exhaustive search over all possible $M^2$ symbol pairs. The ML detector estimates the transmitted symbol indices by minimising the following metric:

$$[\hat{q}_1, \hat{q}_2] = \underset{(x_1, x_2) \in \chi_{LD}}{\mathrm{argmin}} \{\|y_1 - \sqrt{\rho/2}\, H_1 x_1\|_F^2 + \|y_2 - \sqrt{\rho/2}\, H_2 x_2\|_F^2\} \quad (2)$$

Note that the STLD space-time block code (STLD STBC) or code word $X=[x_1\ x_2]$ and the structure of the STLD scheme is similar to that of an Alamouti scheme, however, there are three strict differences between an Alamouti scheme and STLD:

a. The STLD STBC is not orthogonal in general.
b. STLD use two mappers, while the Alamouti scheme uses a single mapper.
c. It is assumed that the channel remains constant for a single time slot only, unlike the assumption in the Alamouti scheme where the channel remains constant over two consecutive time slots.

Theoretical Analysis of STLD is described below.

Dealing firstly with Pairwise Error Probability, let $P(X \rightarrow \hat{X})$ be the unconditional pairwise-error probability (PEP) that the code word $X$ is detected at the receiver as $\hat{X}$, furthermore, at high SNR, we assume that only one symbol ($x_{q_2}$) is detected correctly, while the other symbol ($x_{q_1}$) is erroneously detected. Based on the assumption that one symbol is fully corrected, (1) can be written as:

$$y_1 = \sqrt{\frac{\rho}{2}}\, h_1^1 + n_1 \quad (3)$$

$$y_2 = \sqrt{\frac{\rho}{2}}\, h_2^2 \tilde{x}_1 + n_2 \quad (4)$$

Hence, the PEP conditioned on $H_1$ and $H_2$ is expressed as (See Appendix A for full derivation):

$$P(X \rightarrow \hat{X} \mid H_1, H_2) = Q\left(\sqrt{\frac{\rho}{8}\|h_1^1\|_F^2 |x_{\hat{q}_1} - x_{q_1}|^2 + \frac{\rho}{8}\|h_2^2\|_F^2 |\tilde{x}_{\hat{q}_1} - \tilde{x}_{q_1}|^2}\right) \quad (5)$$

where $Q(\delta)$ is the Gaussian Q-function, (3.5) can be expressed as:

$$P(X \rightarrow \hat{X} \mid H_1, H_2) = Q(\sqrt{k_1 + k_2}) \quad (6)$$

where the random variables $k_1$ and $k_2$ are central chi squared random variables with $2N_r$ degrees of freedom defined as:

$$k_1 = \frac{\rho}{8}\|h_1^1\|_F^2 |x_{\hat{q}_1} - x_{q_1}|^2 = \sum_{n=1}^{2N_r} \alpha_{1_n}^2 \quad (7)$$

$$k_2 = \frac{\rho}{8}\|h_2^2\|_F^2 |\tilde{x}_{\hat{q}_1} - \tilde{x}_{q_1}|^2 = \sum_{n=1}^{2N_r} \alpha_{2_n}^2 \quad (8)$$

where $\alpha_1, \alpha_2 \sim N(0, \sigma_{\alpha_l}^2)$, with $$\sigma_{\alpha_1}^2 = \frac{\rho}{8}d_1 \text{ and } \sigma_{\alpha_2}^2 = \frac{\rho}{8}d_2$$

and $d_1 = |x_{\hat{q}_1} - x_{q_1}|^2$ and $d_2 = |\tilde{x}_{\hat{q}_1} - \tilde{x}_{q_1}|^2$. The PDF of $k_1$ and $k_2$ is given by:

$$p_{k_l}(v_l) = \frac{v_l^{N_r - 1} e^{\frac{-v_l}{2\sigma_{\alpha_l}^2}}}{(2\sigma_{\alpha_l}^2)^{N_r}(N_r - 1)!}, l = 1, 2 \quad (9)$$

The unconditional PEP can be obtained by averaging the conditional PEP in (6) over the independent random variables $k_1$ and $k_2$ for MRC reception as shown in (10) below.

$$P(X \rightarrow \hat{X}) = \int_0^\infty \int_0^\infty P(X \rightarrow \hat{X} \mid H_1, H_2) p_{k_1}(v_1) p_{k_2}(v_2) dv_1 dv_2 \quad (10)$$

The trapezoidal approximation to the $Q(\delta)$ function is used to simplify the above analysis. The approximation is implemented over a total of n iterations as shown in (3.11)

$$Q(\delta) = \frac{1}{2n}\left[\frac{1}{2}\exp\left(\frac{-\delta^2}{2}\right) + \sum_{c=1}^{n-2}\exp\left(\frac{-\delta^2}{2\sin^2(c\pi/2n)}\right)\right] \quad (11)$$

The final PEP can be written as $$P(X \rightarrow \hat{X}) = \quad (12)$$

$$\frac{1}{2n}\left[\frac{1}{2}M_1\left(\frac{1}{2}\right)M_2\left(\frac{1}{2}\right) + \sum_{k=1}^{n-1} M_1\left(\frac{1}{2\sin^2\left(\frac{k\pi}{2n}\right)}\right) M_2\left(\frac{1}{2\sin^2\left(\frac{k\pi}{2n}\right)}\right)\right]$$

where $M_l(\bullet)$ is the moment generating function (MGF) defined as (13).

$$M_l(s) = \int_0^\infty e^{-sv_l} \frac{v_l^{N_r-1} e^{\frac{-v_l}{2\sigma_{\alpha_l}^2}}}{(2\sigma_{\alpha_l}^2)^{N_r}(N_r - 1)!} dv_l = \left(\frac{1}{1 + 2\sigma_{\alpha_l}^2 s}\right)^{N_r}, \quad (13)$$

$l = 1, 2$

At high SNR, (3.12) can be further approximated as, $$P(X \rightarrow \hat{X}) \approx \frac{1}{2n}\left[\frac{1}{2}\left(d_1 d_2 \frac{\rho^2}{64}\right)^{-N_r} + \sum_{k=1}^{n-1}\left(d_1 d_2 \left(\frac{\rho}{8\sin^2\left(\frac{k\pi}{2n}\right)}\right)^2\right)^{-N_r}\right] \quad (14)$$

It is evident from (14) that the PEP is dominated by the minimum product distance $d_1 d_2$, hence, maximizing the minimum product distance $d_1 d_2$ is equivalent to minimizing the PEP. Hence, the design of the two labelling mappers is based on the following rule:

$$\mathrm{argmax}\left\{\min_{\substack{x_{q_1} \neq x_{\hat{q}_1} \\ \tilde{x}_{q_1} \neq \tilde{x}_{\hat{q}_1}}} \left(|x_{\hat{q}_1} - x_{q_1}|^2 |\tilde{x}_{\hat{q}_1} - \tilde{x}_{q_1}|^2\right)\right\} \quad (15)$$

One very effective technique is to place adjacent constellation points of mapper 1 $\omega_1^M$ (refer to FIG. 1) as far as possible through mapper 2 $\omega_2^M$, this effectively maximizes the product distance $d_1 d_2$. The implementation of this technique for M-QAM is to group alternate diagonal pairs in each quadrant and interchange these pairs with pairs in the opposite diagonal quadrant An example of a 1: 16-QAM labelling map is show in the two 16-QAM labelling mappers are shown in FIG. 3.1 and FIG. 3.2. Constellation points B and E are swapped with constellation points L and O, and constellation points D and G are swapped with constellation points J and M.

Assuming ML detection at the receiver, a tight closed-form upper bound on the BER for STLD can be formulated employing the PEP derived in the preceding analysis. Hence, the average BER for STLD is bounded as, $$P_{BER} \leq \frac{1}{Mm} \sum_{q=1}^{M} \sum_{\hat{q} \neq q}^{M} N(q,\hat{q}) P(X_q \to X_{\hat{q}}) \tag{15}$$

where $N(q,\hat{q})$ is the number of bits in error between symbols $x_{q_1}$ and $x_{\hat{q}_1}$, M is the modulation order, $m = \log_2 M$ is the number of bits per symbol and $P(X_q \to X_{\hat{q}})$ is the probability that $X_q$ is erroneously detected as $X_{\hat{q}}$, based on the assumption that $x_{q_2}$ is detected correctly. Substituting (3.11) into (3.15) yields the upper bound on the average BER for STLD. In the next section, the derived upper bound is evaluated and discussed.

$$P_{BER} \leq \frac{1}{Mm} \sum_{q=1}^{M} \sum_{\hat{q} \neq q}^{M} N(q,\hat{q}) \frac{1}{2n} \left[ \frac{1}{2} \left( \frac{1}{1+D_{q\hat{q}}} \right)^{N_r} \left( \frac{1}{1+\tilde{D}_{q\hat{q}}} \right)^{N_r} + \right. \tag{16}$$

$$\left. \sum_{k=1}^{n-1} \left( \frac{1}{1+\frac{D_{q\hat{q}}}{s_k}} \right)^{N_r} \left( \frac{1}{1+\frac{\tilde{D}_{q\hat{q}}}{s_k}} \right)^{N_r} \right]$$

where $N(q,\hat{q})$ is the number of bits in error between symbols $x_{q_1}$ and $x_{q_2}$, M is the modulation order, $$m = \log_2 M, \quad D_{q\hat{q}} = \frac{\rho}{8} |x_{\hat{q}_1} - x_{q_1}|^2,$$

$$\tilde{D}_{q\hat{q}} = \frac{\rho}{8} |\tilde{x}_{\hat{q}_1} - \tilde{x}_{q_1}|^2,$$

$$S_k = \sin^2\left(\frac{k\pi}{2n}\right)$$

and n is the number of iterations for convergence (n>10).

Thus it will be appreciated that a novel space-time block coding system is proposed called Space-time labelling diversity (STLD). Moreover, the STLD STBC outperforms the BER performance of the Alamouti STBC under the same channel assumptions and conditions.

Furthermore, a design method for the labelling maps for square M-QAM and M-PSK for a 2×N_r space-time block coded system are proposed based on the product distance criteria.

Furthermore, a tight closed form union bound on the BER for STLD employing M-QAM/PSK over independent and identically distributed (i.i.d) Rayleigh frequency-flat fading channels is formulated.

APPENDIX A

Based on the assumption that one symbol is fully corrected (4) can be written as:

$$y_1 = \sqrt{\frac{\rho}{2}} h_1^1 x_{q_1} + n_1 \tag{A.1}$$

$$y_2 = \sqrt{\frac{\rho}{2}} h_2^2 \tilde{x}_{q_1} + n_2 \tag{A.2}$$

The PEP conditioned on $h_1^1$ and $h_2^2$ is given by:

$$P(X \to \hat{X} \mid h_1^1, h_2^2) = P\left( \left\| y_1 - \sqrt{\frac{\rho}{2}} h_1^1 x_{\hat{q}_1} \right\|_F^2 + \right. \tag{A.3}$$

$$\left\| y_2 - \sqrt{\frac{\rho}{2}} h_2^2 \tilde{x}_{\hat{q}_1} \right\|_F^2 <$$

$$\left\| y_1 - \sqrt{\frac{\rho}{2}} h_1^1 x_{q_1} \right\|_F^2 +$$

$$\left\| y_2 - \sqrt{\frac{\rho}{2}} h_2^2 \tilde{x}_{q_1} \right\|_F^2 \right)$$

$$= P\left( \left\| n_1 - \sqrt{\frac{\rho}{2}} h_1^1 (x_{\hat{q}_1} - x_{q_1}) \right\|_F^2 + \right. \tag{A.4}$$

$$\left\| n_2 - \sqrt{\frac{\rho}{2}} h_2^2 (\tilde{x}_{\hat{q}_1} - \tilde{x}_{q_1}) \right\|_F^2 <$$

$$\|n_1\|_F^2 + \|n_2\|_F^2 )$$

Threating the square of the frobenius as a binomial and expanding likewise square:

$$= P\left( \left\| \sqrt{\frac{\rho}{2}} h_1^1 (x_{\hat{q}_1} - x_{q_1}) \right\|_F^2 - \right. \tag{A.5}$$

$$2\left( n_1, \sqrt{\frac{\rho}{2}} h_1^1 (x_{\hat{q}_1} - x_{q_1}) \right) + \|n_1\|_F^2 +$$

$$\left\| \sqrt{\frac{\rho}{2}} h_2^2 (\tilde{x}_{\hat{q}_1} - \tilde{x}_{q_1}) \right\|_F^2 -$$

$$\left( n_2, \sqrt{\frac{\rho}{2}} h_2^2 (\tilde{x}_{\hat{q}_1} - \tilde{x}_{q_1}) \right) +$$

$$\|n_2\|_F^2 < \|n_1\|_F^2 + \|n_2\|_F^2 )$$

$$= P\left( \left( n_1, \sqrt{\frac{\rho}{2}} h_1^1 (x_{\hat{q}_1} - x_{q_1}) \right) + \right. \tag{A.6}$$

$$\left( n_2, \sqrt{\frac{\rho}{2}} h_2^2 (\tilde{x}_{\hat{q}_1} - \tilde{x}_{q_1}) \right) >$$

$$\frac{\left\| \sqrt{\frac{\rho}{2}} h_1^1 (x_{\hat{q}_1} - x_{q_1}) \right\|_F^2 + \left\| \sqrt{\frac{\rho}{2}} h_2^2 (\tilde{x}_{\hat{q}_1} - \tilde{x}_{q_1}) \right\|_F^2}{2} \right)$$

where, $$\left( n_1, \sqrt{\frac{\rho}{2}} h_1^1 (x_{\hat{q}_1} - x_{q_1}) \right) \text{ and } \left( n_2, \sqrt{\frac{\rho}{2}} h_2^2 (\tilde{x}_{\hat{q}_1} - \tilde{x}_{q_1}) \right)$$

are Gaussian random variables with zero mean and variances of, $$\left\| \sqrt{\frac{\rho}{2}} h_1^1 (x_{\hat{q}_1} - x_{q_1}) \right\|_F^2 \text{ and } \left\| \sqrt{\frac{\rho}{2}} h_2^2 (\tilde{x}_{\hat{q}_1} - \tilde{x}_{q_1}) \right\|_F^2$$

respectively. The sum of these Gaussian random variables results in a new Gaussian random variable with zero mean and variance given by $$\left\| \sqrt{\frac{\rho}{2}} h_1^1 (x_{\hat{q}_1} - x_{q_1}) \right\|_F^2 + \left\| \sqrt{\frac{\rho}{2}} h_2^2 (\tilde{x}_{\hat{q}_1} - \tilde{x}_{q_1}) \right\|_F^2$$

We know that for a Gaussian random variable Z with zero mean and unit variance $$P(Z > z) = \frac{1}{\sqrt{2\pi}} \int_z^\infty e^{\frac{-v}{2}} dv \quad (A.7)$$

$$= Q(z) \quad (A.8)$$

Hence, $$P(X \to \hat{X} \mid h_1^1, h_2^2) = Q\left( \frac{\left\| \sqrt{\frac{\rho}{2}} h_1^1 (x_{\hat{q}_1} - x_{q_1}) \right\|_F^2 + \left\| \sqrt{\frac{\rho}{2}} h_2^2 (\tilde{x}_{\hat{q}_1} - \tilde{x}_{q_1}) \right\|_F^2}{2} \cdot \frac{1}{\sqrt{\left\| \sqrt{\frac{\rho}{2}} h_1^1 (x_{\hat{q}_1} - x_{q_1}) \right\|_F^2 + \left\| \sqrt{\frac{\rho}{2}} h_2^2 (\tilde{x}_{\hat{q}_1} - \tilde{x}_{q_1}) \right\|_F^2}} \right) \quad (A.9)$$

$$= Q\left( \sqrt{ \frac{\rho \left( \left\| h_1^1 (x_{\hat{q}_1} - x_{q_1}) \right\|_F^2 + \left\| h_2^2 (\tilde{x}_{\hat{q}_1} - \tilde{x}_{q_1}) \right\|_F^2 \right)}{8} } \right) \quad (A.10)$$

The invention claimed is:

1. A transmitter for a wireless communications system for implementing space-time labelling diversity for uncoded conventional modulation, the transmitter including:
   a first bit mapper;
   a second bit mapper which is different to the first bit mapper;
   a first transmitter;
   a second transmitter; and
   a processor connected to the first and second mappers and the first and second transmitters, the processor controlling these to:
      receive two bit streams and simultaneously feed these into the first mapper and the second mapper, wherein the first mapper maps these into first and second mapped bit streams and the second mapper maps these into third and fourth mapped bit streams which are different from the first and second mapper bit streams;
      transmit the first mapped bit stream in a first time slot via the first transmitter;
      transmit the second mapped bit stream in the first time slot via the second transmitter;
      transmit the third mapped bit stream in a second time slot via the second transmitter; and
      transmit the fourth mapped bit stream in a second time slot via the first transmitter.

2. A transmitter according to claim 1 wherein the first mapper maps the bit streams based on a conventional mapping constellation and the second mapper maps the bit streams based on placing adjacent neighbor symbols as far as possible within the constellation.

3. A transmitter according to claim 1 or claim 2 wherein the first and second transmitters receive baseband signals and converts these up to passband signals for transmission.

\* \* \* \* \*